US009990287B2

(12) United States Patent
Raikin et al.

(10) Patent No.: US 9,990,287 B2
(45) **Date of Patent: *Jun. 5, 2018**

(54) APPARATUS AND METHOD FOR MEMORY-HIERARCHY AWARE PRODUCER-CONSUMER INSTRUCTION

(75) Inventors: Shlomo Raikin, Ofer (IL); Raanan Sade, Kibutz Sanid (IL); Robert Valentine, Kiryat Tivon (IL); Julius Yuli Mandelblat, Haifa (IL); Ron Shalev, Ceaseria (IL); Larisa Novakovsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 104 days.

This patent is subject to a terminal disclaimer.

(21) Appl. No.: 13/994,122

(22) PCT Filed: Dec. 21, 2011

(86) PCT No.: PCT/US2011/066674

§ 371 (c)(1), (2), (4) Date: Jun. 13, 2013

(87) PCT Pub. No.: WO2013/095475

PCT Pub. Date: Jun. 27, 2013

(65) Prior Publication Data

US 2014/0192069 A1 Jul. 10, 2014

(51) Int. Cl.
*G06F 13/38* (2006.01)
*G06T 1/20* (2006.01)
(Continued)

(52) U.S. Cl.
CPC ...... *G06F 12/0811* (2013.01); *G06F 9/30043* (2013.01); *G06F 9/30047* (2013.01);
(Continued)

(58) Field of Classification Search
None
See application file for complete search history.

(56) References Cited

U.S. PATENT DOCUMENTS 5,530,933 A * 6/1996 Frink et al. .................. 711/141
5,623,628 A 4/1997 Brayton et al.
(Continued)

FOREIGN PATENT DOCUMENTS

CN 1425154 A 6/2003
CN 1624673 A 6/2005
(Continued)

OTHER PUBLICATIONS

PCT/US2011/066674 Notification of Transmittal of the International Search Report and the Written Opinion of the International Searching Authority, or the Declaration, dated Aug. 30, 2012, 8 pages.

(Continued)

*Primary Examiner* — Saptarshi Mazumder
(74) *Attorney, Agent, or Firm* — Nicholson De Vos Webster & Elliott LLP

(57) ABSTRACT

An apparatus and method are described for efficiently transferring data from a core of a central processing unit (CPU) to a graphics processing unit (GPU). For example, one embodiment of a method comprises: writing data to a buffer within the core of the CPU until a designated amount of data has been written; upon detecting that the designated amount of data has been written, responsively generating an eviction cycle, the eviction cycle causing the data to be transferred from the buffer to a cache accessible by both the core and the GPU; setting an indication to indicate to the GPU that data is available in the cache; and upon the GPU detecting the indication, providing the data to the GPU from the cache upon receipt of a read signal from the GPU.

21 Claims, 7 Drawing Sheets

(51) Int. Cl.

| | |
|---|---|
| ***G06F 12/0811*** | (2016.01) |
| ***G06F 9/30*** | (2018.01) |
| ***G06F 9/38*** | (2018.01) |
| ***G06F 13/16*** | (2006.01) |
| ***G06T 1/60*** | (2006.01) |
| *G09G 5/00* | (2006.01) |
| *G06F 12/0866* | (2016.01) |

(52) U.S. Cl.

CPC ........ *G06F 9/30087* (2013.01); *G06F 9/3881* (2013.01); *G06F 13/1673* (2013.01); *G06F 13/38* (2013.01); *G06T 1/20* (2013.01); *G06T 1/60* (2013.01); *G06F 12/0866* (2013.01); *G09G 5/006* (2013.01)

(56) References Cited

U.S. PATENT DOCUMENTS

| | | | |
|---|---|---|---|
| 5,630,075 A | 5/1997 | Joshi et al. | |
| 6,052,769 A * | 4/2000 | Huff | G06F 9/30032 710/68 |
| 6,073,210 A * | 6/2000 | Palanca et al. | 711/118 |
| 6,513,099 B1 | 1/2003 | Smith et al. | |
| 6,546,462 B1 * | 4/2003 | Palanca | G06F 12/0811 711/135 |
| 6,598,128 B1 | 7/2003 | Yoshioka et al. | |
| 7,120,755 B2 | 10/2006 | Jamil et al. | |
| 7,577,792 B2 | 8/2009 | Hady et al. | |
| 8,141,068 B1 | 3/2012 | Thompson | |
| 8,327,071 B1 | 12/2012 | Danskin et al. | |
| 2003/0108053 A1 * | 6/2003 | Inaba | 370/400 |
| 2003/0126365 A1 | 7/2003 | Jamil et al. | |
| 2003/0126366 A1 | 7/2003 | Jourdan | |
| 2005/0135402 A1 | 6/2005 | Kawaguchi et al. | |
| 2006/0004966 A1 | 1/2006 | Gonion | |
| 2006/0004996 A1 | 1/2006 | Gonion | |
| 2006/0080511 A1 | 4/2006 | Hoover et al. | |
| 2006/0095672 A1 * | 5/2006 | Andrews et al. | 711/118 |
| 2006/0112226 A1 * | 5/2006 | Hady et al. | 711/130 |
| 2006/0112227 A1 | 5/2006 | Hady et al. | |
| 2006/0143406 A1 | 6/2006 | Chrysos et al. | |
| 2006/0150010 A1 * | 7/2006 | Stiffler et al. | 714/13 |
| 2008/0270708 A1 | 10/2008 | Warner et al. | |
| 2009/0077320 A1 | 3/2009 | Hoover et al. | |
| 2009/0150642 A1 * | 6/2009 | Heil | G06F 12/1009 711/203 |
| 2009/0282221 A1 | 11/2009 | Heil et al. | |
| 2010/0070730 A1 * | 3/2010 | Pop et al. | 711/167 |
| 2010/0077175 A1 | 3/2010 | Wu et al. | |
| 2010/0131720 A1 | 5/2010 | Harper, III et al. | |
| 2010/0138607 A1 | 6/2010 | Hughes et al. | |
| 2010/0138610 A1 | 6/2010 | Rappoport et al. | |
| 2010/0220102 A1 | 9/2010 | Wyatt et al. | |
| 2012/0331307 A1 * | 12/2012 | Fernandez Gutierrez | 713/190 |

FOREIGN PATENT DOCUMENTS

| | | |
|---|---|---|
| CN | 1783033 A | 6/2006 |
| DE | 19506734 A1 | 9/1995 |
| TW | 200734879 A | 9/2007 |
| TW | 200933524 A | 8/2009 |
| TW | 201020965 A | 6/2010 |
| TW | 201145172 A | 12/2011 |
| TW | M417730 U1 | 12/2011 |

OTHER PUBLICATIONS

International Preliminary Report on Patentability for Application No. PCT/US2011/066630, dated Jul. 3, 2014, 8 pages.

Taiwan Office Action and Taiwan Search Report for Taiwan Application No. 101142183, dated Dec. 22, 2014, 13 pages.

International Search Report and Written Opinion for Application No. PCT/US2011/066630, dated Sep. 19, 2012, 10 pages.

Allowance Decision of Examination for Taiwan Application No. 101142183, dated Oct. 7, 2015, 2 pages.

Allowance Decision of Examination and Taiwan Search Report for Taiwan Application No. 101146624, dated Sep. 26, 2014, 4 pages.

International Preliminary Report on Patentability for International Application No. PCT/US2011/066674, dated Jul. 3, 2014, 5 pages.

Office Action for counterpart U.S. Appl. No. 13/994,724, dated Feb. 12, 2015, 20 pages.

Final Office Action for counterpart U.S. Appl. No. 13/994,724, dated Aug. 28, 2015, 19 pages.

Office Action for counterpart U.S. Appl. No. 13/994,724, dated Feb. 25, 2016, 24 pages.

First China Office Action for foreign counterpart China Application No. 201180075740.6, dated Jan. 28, 2016, 12 pages.

First China Office Action for foreign counterpart China Application No. 201180075875.2, dated Feb. 2, 2016, 11 pages.

Second China Office Action for foreign counterpart China Application No. 201180075875.2, dated Sep. 30, 2016, 9 pages.

Final Office Action for counterpart U.S. Appl. No. 13/994,724, dated Aug. 17, 2016, 20 pages.

Decision on Rejection for foreign counterpart China Application No. 201180075740.6, dated Dec. 27, 2016, 18 pages.

Non-Final Office Action for U.S. Appl. No. 13/994,724, dated Feb. 27, 2017, 21 pages.

Second China Office Action for foreign counterpart China Application No. 201180075740.6, dated Sep. 27, 2016, 30 pages.

Final Office Action for U.S. Appl. No. 13/994,724, dated Jul. 13, 2017, 26 pages.

Third China Office Action for foreign counterpart China Application No. 201180075875.2, dated Jun. 2, 2017, 29 pages.

* cited by examiner

WB Store

Mov Non-Allocate

WB Store

Stores From Different Instructions May Not Be Interleaved here in Unordered Manner

Fig. 4b

APPARATUS AND METHOD FOR MEMORY-HIERARCHY AWARE PRODUCER-CONSUMER INSTRUCTION

CROSS-REFERENCE TO RELATED APPLICATION

This patent application is a U.S. National Phase Application under 35 U.S.C. § 371 of International Application No. PCT/US2011/066674, filed Dec. 21, 2011, entitled APPARATUS AND METHOD FOR MEMORY-HIERARCHY AWARE PRODUCER-CONSUMER INSTRUCTION.

BACKGROUND

Field of the Invention

This invention relates generally to the field of computer processors. More particularly, the invention relates to an apparatus and method for implementing a memory-hierarchy aware producer-consumer instruction.

Description of the Related Art

In a model where a CPU 101 and GPU 102 work in a producer-consumer mode with the CPU as the producer and GPU as the consumer, the data transfer between them is performed as illustrated in FIG. 1. The CPU in the illustrated example includes a multi-level cache hierarchy including a level 1 (L1) cache 110 (sometimes referred to as an Upper Level Cache (ULC)); a level 2 (L2) cache 111 (sometimes referred to as a Mid-Level Cache (MLC)); and a level 3 (L3) cache 112 (sometimes referred to as a Lower Level Cache (LLC)). Both the GPU 102 and the CPU 101 are coupled to the L3 cache and a main memory 100.

To provide data to the GPU, the CPU performs a non-temporal store to main memory. A non-temporal store in this context is a store using data which is not anticipated to be needed by the CPU in the near future. Consequently, the store is directed to main memory rather than one of the caches in the hierarchy. Non-temporal stores may be implemented using, for example, the Uncacheable Speculative Write Combining (USWC) memory type or non-temporal store instructions (e.g., MovNT store instructions). Using a USWC operation, the data is not cached but the CPU may combine data in internal Write Combining (WC) buffers in the CPU before transferring the data all the way out to main memory. USWC operations also allow reading of data from memory in an out of order manner.

Non-temporal stores are by nature weakly ordered meaning that data may be accessed in an order deviating from the order specified in program execution. For example, the program may specify the operation order "store A and then store B," but in operation the CPU may store B and then store A. Because of this characteristic of non-temporal stores, a Fence instruction is needed to force all stores to be ordered as per program execution. The Fence instruction enforces an ordering constraint on memory operations issued before and after the Fence instruction, thereby ordering all the weakly ordered instructions from the CPU.

After the data has been successfully written to main memory and ordered using a Fence instruction, the Fence producer writes to a flag notifying the consumer (the GPU in the example) that the data is ready. The consumer observes that the flag has been written, either by polling or by other techniques such as an interrupt, and generates unordered data fetch transactions (reads) to read the data.

The foregoing approach suffers from low latency and low bandwidth because the store operations by the CPU and the read operations by the GPU must go all the way out to main memory 100. Consequently, a more efficient mechanism is needed for transferring data between a CPU and a GPU.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

In one embodiment, rather than storing the data all the way to main memory as in prior implementations, the highest cache level common to both the CPU and the GPU is used for the data exchange. For example, if both the CPU and the GPU have read/write access to the level 3 (L3) cache (also sometimes referred to as the lower level cache) then the L3 cache is used to exchange the data. The underlying principles of the invention, however, are not limited to the use of any particular cache level for exchanging data.

Figure 1:
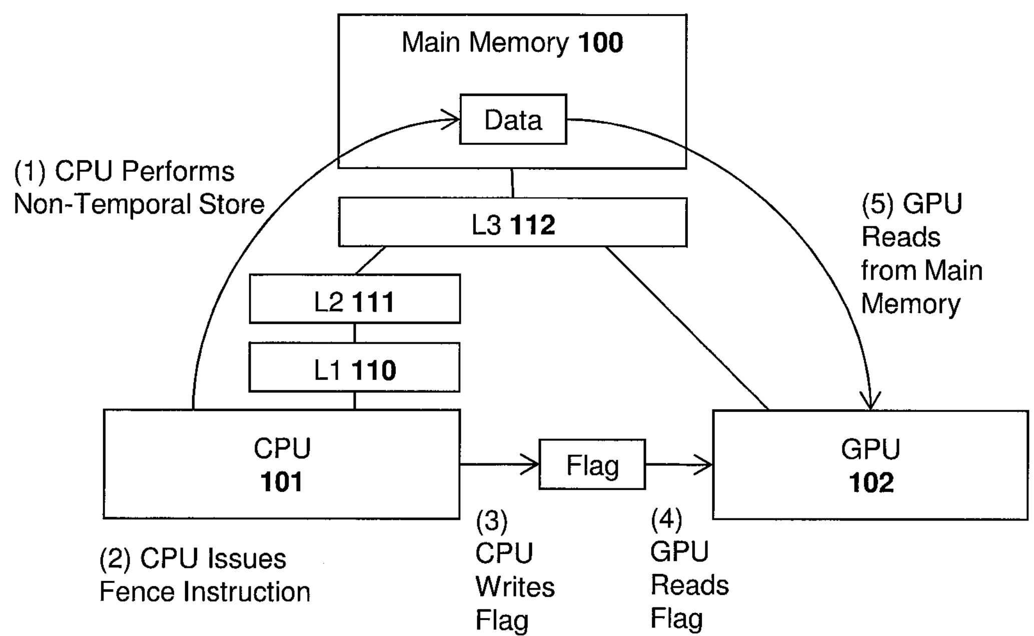
FIG. 1 illustrates a prior art processor architecture for exchanging data between a CPU and a GPU.
Figure 2:
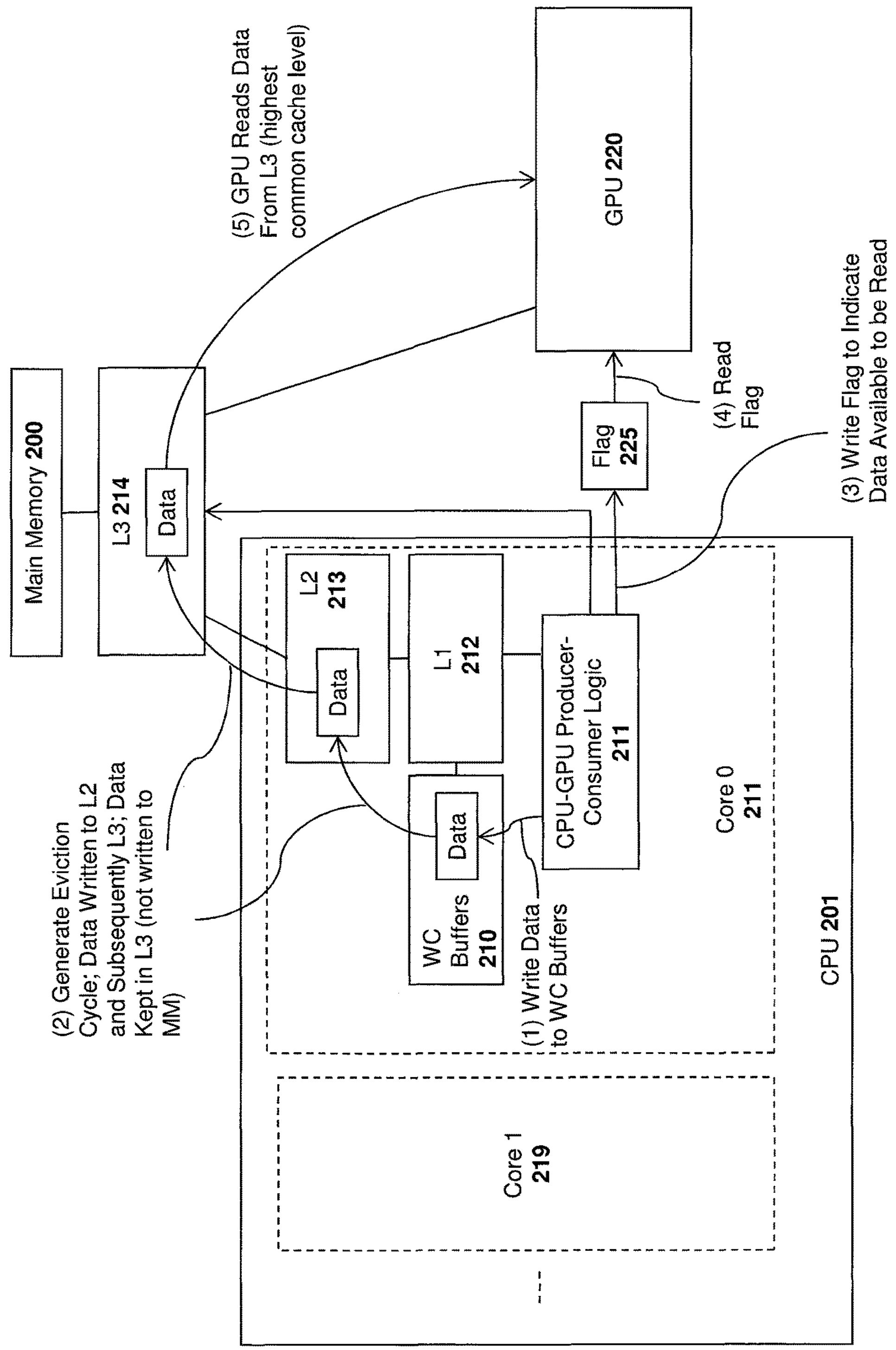
FIG. 2 illustrates a processor architecture in accordance with one embodiment of the invention for exchanging data between a CPU and a GPU.

As illustrated in FIG. 2, one embodiment of the invention is implemented within the context of a multi-core central processing unit (CPU) 201. For simplicity, the details of this embodiment of the invention are shown for a single core 211, but the underlying principles apply equally to all cores of the CPU 201 (e.g., Core 1 219), and/or to single core CPUs. CPU-GPU producer-consumer logic 211 implements the techniques described herein for exchanging data with a graphics processing unit (GPU) 220. In operation, the CPU-GPU producer-consumer logic 211 initially writes the data to be exchanged to write combining buffers 210. Caches (such as the L1, L2, and L3 caches 212, 213, and 214, respectively) work in cache lines which are a fixed size (64 bytes in one particular embodiment) whereas typical store operations can vary from 4 bytes to 64 bytes in size. In one embodiment, the write-combining buffers 210 are used to combine multiple stores until a complete cache line is filled and then the data is moved between cache levels. Thus, in the example shown in FIG. 2, the data is written to the write combining buffers 210 until an amount equal to a complete cache line is stored. An eviction cycle is then generated and the data is moved from the write-combining buffers 210 to the L2 cache 213 and then from the L2 cache to the L3 cache. However, in contrast to prior implementations, a signal from the CPU-GPU producer-consumer logic 211 instructs the L3 cache 214 to hold a copy of the data for the data exchange with the GPU (rather than writing the data all the way to main memory).

The CPU-GPU producer-consumer logic 211 then writes a flag 225 to indicate that the data is ready for transfer. In one embodiment, the flag 225 is a single bit (e.g., with a '1' indicating that the data is ready in the L3 cache). The GPU 220 reads the flag 225 to determine that the data is ready, either through periodic polling or an interrupt. Once it learns that data is ready in the L3 cache (or other highest common cache level shared with the CPU 201), the GPU 220 reads the data.

Figure 3:
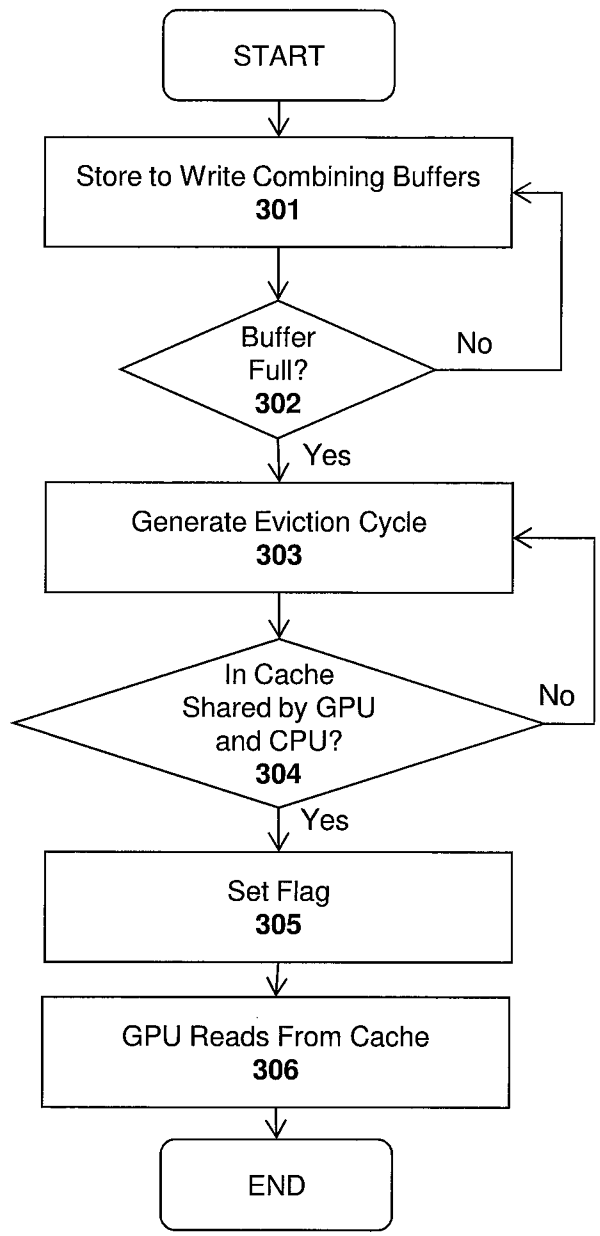
FIG. 3 illustrates one embodiment of a method for exchanging data between a CPU and a GPU.

A method in accordance with one embodiment of the invention is illustrated in FIG. 3. The method may be implemented within the context of the architecture shown in FIG. 2, but is not limited to any particular architecture.

At 301, the data is stored to the write-combing buffers within the CPU. As mentioned, a chunk of data equal to a complete cache line may be stored within the write-combining buffers. Once the buffer is full (e.g., by an amount equal to a cache line) 302, an eviction cycle is generated at 303. The eviction cycle persists until the data is stored within a cache level common to both the CPU and the GPU, determined at 304. At 305, a flag is set to indicate that the data is available for the GPU, and at 306, the GPU reads the data from the cache.

Figure 4A:
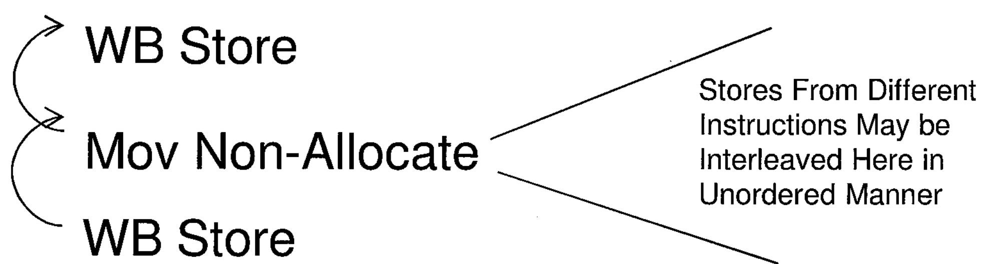
FIG. 4 illustrates a computer system on which embodiments of the invention may be implemented.

In one embodiment, the data is transferred to the write-combining buffers and then evicted to the L3 cache using a specific instruction, referred to herein as a MovNonAllocate (MovNA) instruction. As indicated in FIG. 4*a*, in one embodiment, individual MovNA instructions may be interleaved with one another and, as indicated by the arrows, with other write-back (WB) store instructions (i.e., write bypassing is permitted), thereby improving performance (i.e., the weaker the memory ordering semantics the faster the system can perform). In this implementation, strong ordering may be enforced by the user when required using the Fence instruction. As is understood by those of skill in the art, a fence instruction is a type of barrier and a class of instruction which causes a central processing unit (CPU) or compiler to enforce an ordering constraint on memory operations issued before and after the fence instruction.

Figure 4B:
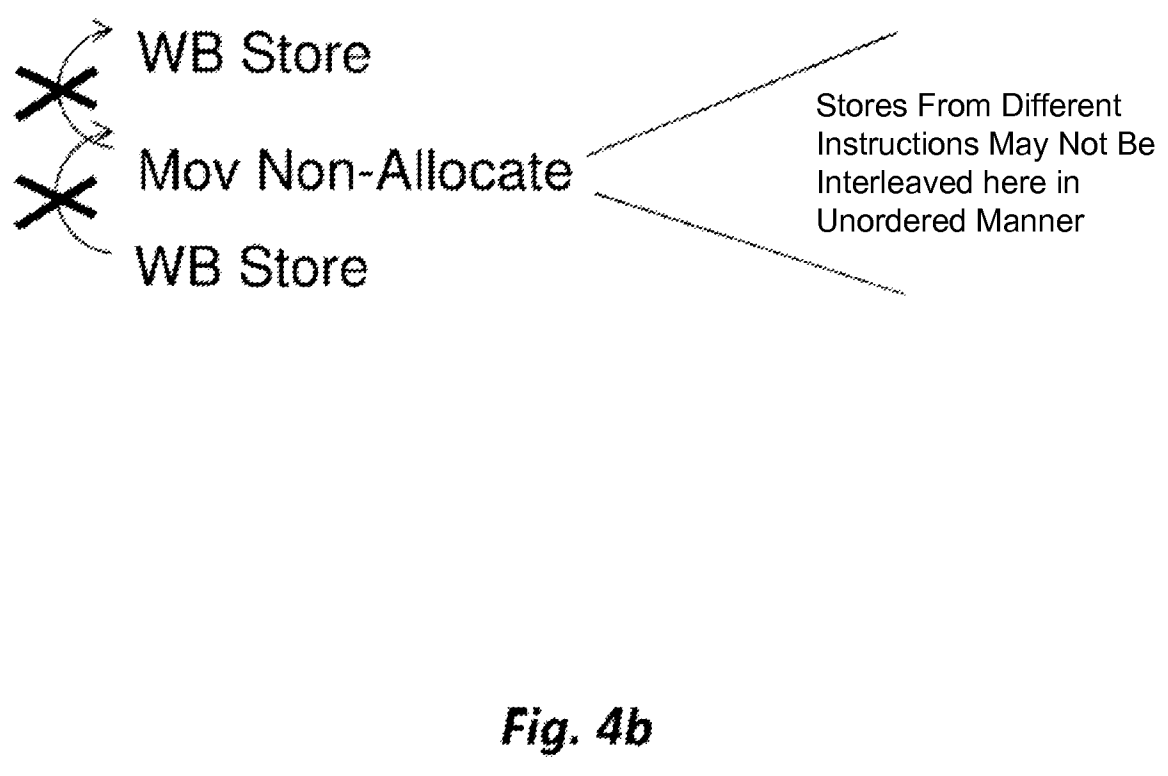

In an alternative implementation, illustrated in FIG. 4*b*, individual MovNA instructions may be interleaved with one another but, as indicated by the X through the arrows, may not be interleaved with other write-back (WB) store instructions (i.e., write bypassing is not permitted). While this implementation reduces performance (i.e., the stronger the memory ordering semantics the slower the system performs), it does not require the user to issue a fence instruction to ensure proper instruction ordering.

Figure 5:
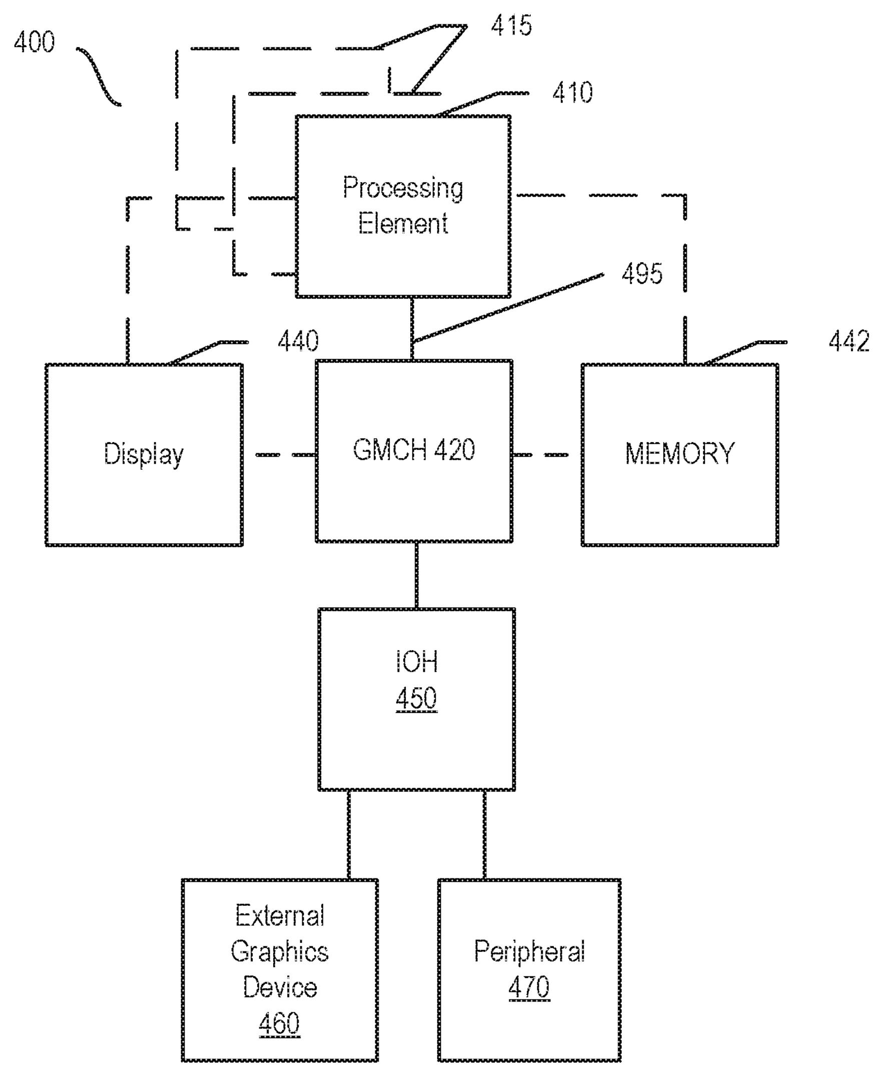
FIG. 5 illustrates another computer system on which embodiments of the invention may be implemented.

Referring now to FIG. 5, shown is a block diagram of another computer system 400 in accordance with one embodiment of the present invention. The system 400 may include one or more processing elements 410, 415, which are coupled to graphics memory controller hub (GMCH) 420. The optional nature of additional processing elements 415 is denoted in FIG. 5 with broken lines.

Each processing element may be a single core or may, alternatively, include multiple cores. The processing elements may, optionally, include other on-die elements besides processing cores, such as integrated memory controller and/or integrated I/O control logic. Also, for at least one embodiment, the core(s) of the processing elements may be multithreaded in that they may include more than one hardware thread context per core.

FIG. 5 illustrates that the GMCH 420 may be coupled to a memory 440 that may be, for example, a dynamic random access memory (DRAM). The DRAM may, for at least one embodiment, be associated with a non-volatile cache.

The GMCH 420 may be a chipset, or a portion of a chipset. The GMCH 420 may communicate with the processor(s) 410, 415 and control interaction between the processor(s) 410, 415 and memory 440. The GMCH 420 may also act as an accelerated bus interface between the processor(s) 410, 415 and other elements of the system 400. For at least one embodiment, the GMCH 420 communicates with the processor(s) 410, 415 via a multi-drop bus, such as a frontside bus (FSB) 495.

Furthermore, GMCH 420 is coupled to a display 440 (such as a flat panel display). GMCH 420 may include an integrated graphics accelerator. GMCH 420 is further coupled to an input/output (I/O) controller hub (ICH) 450, which may be used to couple various peripheral devices to system 400. Shown for example in the embodiment of FIG. 4 is an external graphics device 460, which may be a discrete graphics device coupled to ICH 450, along with another peripheral device 470.

Alternatively, additional or different processing elements may also be present in the system 400. For example, additional processing element(s) 415 may include additional processors(s) that are the same as processor 410, additional processor(s) that are heterogeneous or asymmetric to processor 410, accelerators (such as, e.g., graphics accelerators or digital signal processing (DSP) units), field programmable gate arrays, or any other processing element. There can be a variety of differences between the physical resources 410, 415 in terms of a spectrum of metrics of merit including architectural, microarchitectural, thermal, power consumption characteristics, and the like. These differences may effectively manifest themselves as asymmetry and heterogeneity amongst the processing elements 410, 415. For at least one embodiment, the various processing elements 410, 415 may reside in the same die package.

Figure 6:
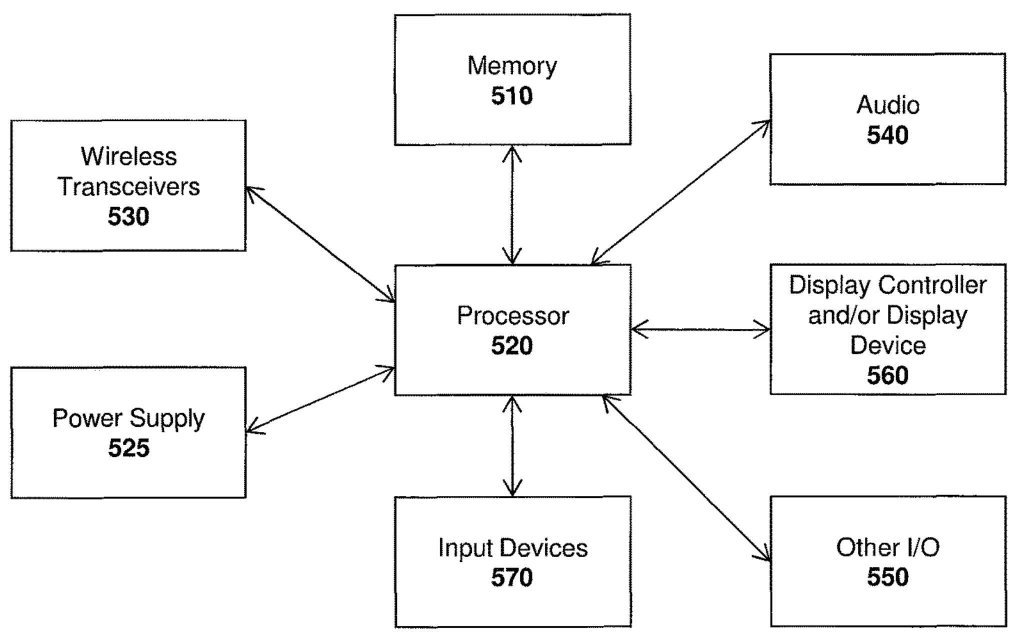
FIG. 6 illustrates another computer system on which embodiments of the invention may be implemented.

FIG. 6 is a block diagram illustrating another exemplary data processing system which may be used in some embodiments of the invention. For example, the data processing system 500 may be a handheld computer, a personal digital assistant (PDA), a mobile telephone, a portable gaming system, a portable media player, a tablet or a handheld computing device which may include a mobile telephone, a media player, and/or a gaming system. As another example, the data processing system 500 may be a network computer or an embedded processing device within another device.

According to one embodiment of the invention, the exemplary architecture of the data processing system 900 may used for the mobile devices described above. The data processing system 900 includes the processing system 520, which may include one or more microprocessors and/or a system on an integrated circuit. The processing system 520 is coupled with a memory 910, a power supply 525 (which includes one or more batteries) an audio input/output 540, a display controller and display device 560, optional input/output 550, input device(s) 570, and wireless transceiver(s) 530. It will be appreciated that additional components, not shown in FIG. 5, may also be a part of the data processing system 500 in certain embodiments of the invention, and in certain embodiments of the invention fewer components than shown in FIG. 55 may be used. In addition, it will be appreciated that one or more buses, not shown in FIG. 5, may be used to interconnect the various components as is well known in the art.

The memory 510 may store data and/or programs for execution by the data processing system 500. The audio input/output 540 may include a microphone and/or a speaker to, for example, play music and/or provide telephony functionality through the speaker and microphone. The display controller and display device 560 may include a graphical user interface (GUI). The wireless (e.g., RF) transceivers 530 (e.g., a WiFi transceiver, an infrared transceiver, a Bluetooth transceiver, a wireless cellular telephony transceiver, etc.) may be used to communicate with other data processing systems. The one or more input devices 570 allow a user to provide input to the system. These input devices may be a keypad, keyboard, touch panel, multi touch panel, etc. The optional other input/output 550 may be a connector for a dock.

Other embodiments of the invention may be implemented on cellular phones and pagers (e.g., in which the software is embedded in a microchip), handheld computing devices (e.g., personal digital assistants, smartphones), and/or touch-tone telephones. It should be noted, however, that the underlying principles of the invention are not limited to any particular type of communication device or communication medium.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

Elements of the present invention may also be provided as a computer program product which may include a machine-readable medium having stored thereon instructions which may be used to program a computer (or other electronic device) to perform a process. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A method for transferring a chunk of data from a core of a central processing unit (CPU) to a graphics processing unit (GPU), comprising:

executing a first instruction, the first instruction being a single instruction, wherein the first instruction comprises a MovNonAllocate store instruction, the executing comprising:

responsive to the first instruction, writing data, without caching the data, to a buffer within the core of the CPU until a designated amount of data has been written, wherein the buffer combines multiple stores until the designated amount of data has been written, and upon detecting that the designated amount of data has been written, responsively generating an eviction cycle, the eviction cycle causing the data to be transferred from the buffer to a cache shared by both the core and the GPU, wherein the cache is a level 3 cache;

setting an indication to indicate to the GPU that data is available in the cache; and upon the GPU detecting the indication, providing the data to the GPU from the cache upon receipt of a read signal from the GPU.

2. The method as in claim 1 wherein the indication comprises a flag writable by the core and readable by the GPU.

3. The method as in claim 2 wherein the flag comprises a binary value indicative having a first value indicating that the data is available in the cache and a second value indicating that data is not available in the cache.

4. The method as in claim 1 wherein the GPU reads the indication via a polling technique in which the GPU periodically reads polls for the indication.

5. The method as in claim 1 wherein the GPU reads the indication in response to an interrupt signal.

6. The method as in claim 1 further comprising:

permitting the first instruction to be interleaved with a plurality of other instructions of the same instruction type.

7. The method as in claim 1 further comprising:

permitting the first instruction to be interleaved with a plurality of other instructions of different instruction types.

8. The method as in claim 7 wherein the other instructions are write-back store instructions.

9. The method as in claim 1 wherein the buffer within the CPU is a write-back buffer.

10. The method as in claim 1 wherein the CPU comprises a plurality of cores, each capable of performing the method.

11. An instruction processing apparatus comprising:

at least one core of a central processing unit (CPU) and a cache shared by both the core and a graphics processing unit (GPU); and the core comprising CPU-GPU producer-consumer logic configured to perform the operations of:

executing a first instruction, the first instruction being a single instruction, wherein the first instruction comprises a MovNonAllocate store instruction, the executing comprising:

writing data, without caching the data, to a buffer within the core of the CPU until a designated amount of data has been written, wherein the buffer combines multiple stores until the designated amount of data has been written, and upon detecting that the designated amount of data has been written, responsively generating an eviction cycle, the eviction cycle causing the data to be transferred from the buffer to the cache shared by both the core and the GPU, wherein the cache is a level 3 cache; and setting an indication to indicate to the GPU that data is available in the cache;

wherein upon the GPU detecting the indication, the data is provided to the GPU from the cache upon receipt of a read signal from the GPU.

12. The instruction processing apparatus as in claim 11 wherein the indication comprises a flag writable by the core and readable by the GPU.

13. The instruction processing apparatus as in claim 12 wherein the flag comprises a binary value indicative having a first value indicating that the data is available in the cache and a second value indicating that data is not available in the cache.

14. The instruction processing apparatus as in claim 11 wherein the GPU reads the indication via a polling technique in which the GPU periodically reads polls for the indication.

15. The instruction processing apparatus as in claim 11 wherein the GPU reads the indication in response to an interrupt signal.

16. The instruction processing apparatus as in claim 11 wherein the CPU-GPU producer-consumer logic permits the first instruction to be interleaved with a plurality of other instructions of the same instruction type.

17. The instruction processing apparatus as in claim 11 wherein the CPU-GPU producer-consumer logic permits the first instruction to be interleaved with a plurality of other instructions of different instruction types.

18. The instruction processing apparatus as in claim 17 wherein the other instructions are write-back store instructions.

19. The instruction processing apparatus as in claim 11 wherein the buffer within the CPU is a write-back buffer.

20. The instruction processing apparatus as in claim 11 wherein the CPU comprises a plurality of cores, each having CPU-GPU producer-consumer logic for performing the specified operations.

21. A computer system comprising:

a graphics processor unit (GPU) for processing a set of graphics instructions to render video; and a central processing unit (CPU) comprising:

at least one core and a cache shared by both the core and the GPU; and the core comprising CPU-GPU producer-consumer logic configured to perform the operations of:

executing a first instruction, the first instruction being a single instruction, wherein the first instruction comprises a MovNonAllocate store instruction, the executing comprising:

writing data to a buffer within the core of the CPU until a designated amount of data has been written, wherein the buffer combines multiple stores until the designated amount of data has been written, and upon detecting that the designated amount of data has been written, responsively generating an eviction cycle, the eviction cycle causing the data to be transferred from the buffer to the cache shared by both the core and the GPU, wherein the cache is a level 3 cache; and setting an indication to indicate to the GPU that data is available in the cache;

wherein upon the GPU detecting the indication, the data is provided to the GPU from the cache upon receipt of a read signal from the GPU.

* * * * *